United States Patent [19]

Holloway et al.

[11] Patent Number: 4,646,882
[45] Date of Patent: Mar. 3, 1987

[54] BRAKE SLACK ADJUSTER

[75] Inventors: Robert M. Holloway; Robert L. Ludington, both of Michigan City, Ind.; Robert G. Beacon, Sparta, N.J.

[73] Assignee: Holloway and Ludington, Michigan City, Ind.

[21] Appl. No.: 747,721

[22] Filed: Jun. 21, 1985

[51] Int. Cl.$^4$ .............................................. F16D 65/66
[52] U.S. Cl. .................................. 188/202; 188/196 D
[58] Field of Search ............ 188/202, 196 BA, 196 D

[56] References Cited

U.S. PATENT DOCUMENTS

| | | | |
|---|---|---|---|
| 3,326,336 | 6/1967 | Sobol et al. | 188/202 |
| 3,669,224 | 6/1972 | Billeter | 188/202 |
| 3,850,269 | 11/1974 | Beacon | 188/202 |
| 3,900,086 | 8/1975 | Billeter | 188/202 |
| 4,405,037 | 9/1983 | Severinsson et al. | 188/202 X |

Primary Examiner—George E. A. Halvosa
Attorney, Agent, or Firm—Brooks Haidt Haffner & Delahunty

[57] ABSTRACT

A brake slack adjuster with axially aligned, first and second load members connectible at their free ends, respectively, to the brake rigging and a lever operable by the piston of the brake cylinder. First and second brakes act between the load members. The second load member is movable axially with respect to the first brakes which, in first relative positions thereof, permits axial movement of the load members relative to each other and which, in second relative positions thereof, prevents relative axial movement of the load members. The second brake is movable relative to the second load member and prevents relative movement of the load members until the braking force exceeds a value, such as 1000 pounds. The second brake is releasable by a spring loaded, axially movable actuator so that the second load member can move axially to its second position and cause actuation of the first brake.

13 Claims, 16 Drawing Figures

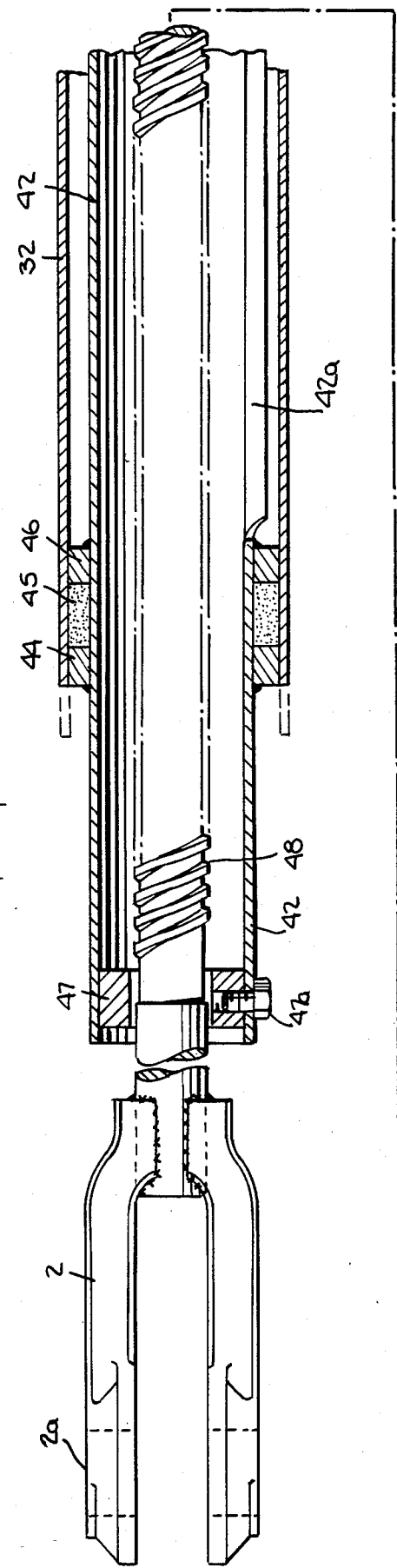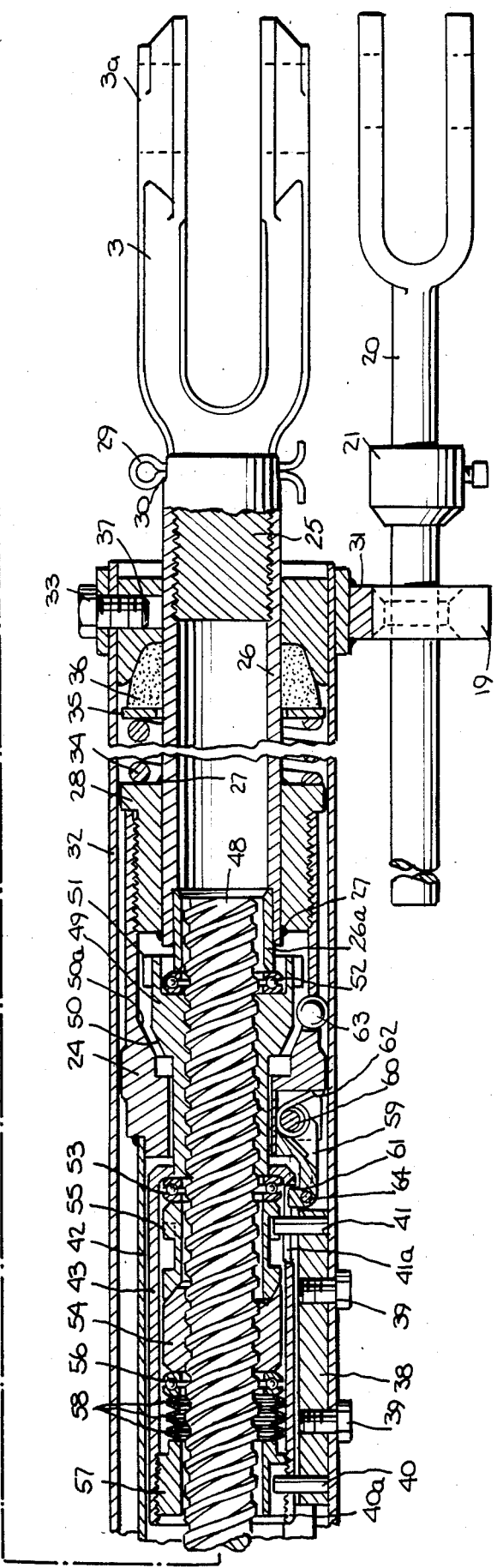
Fig. 3.

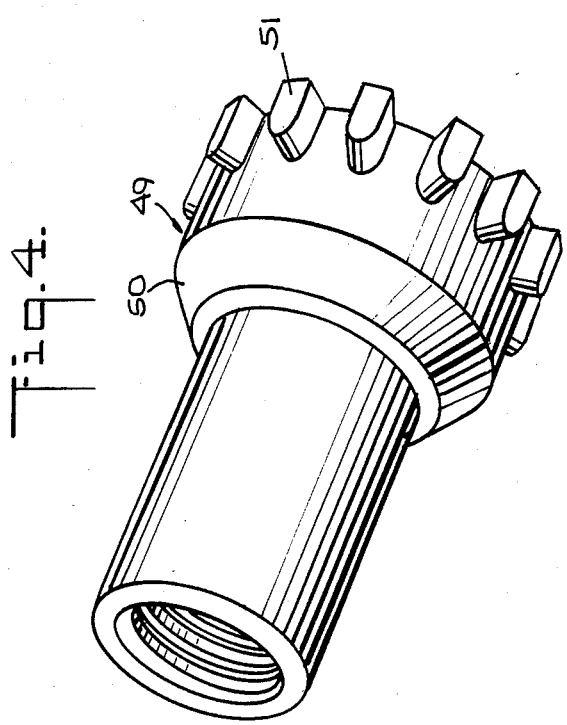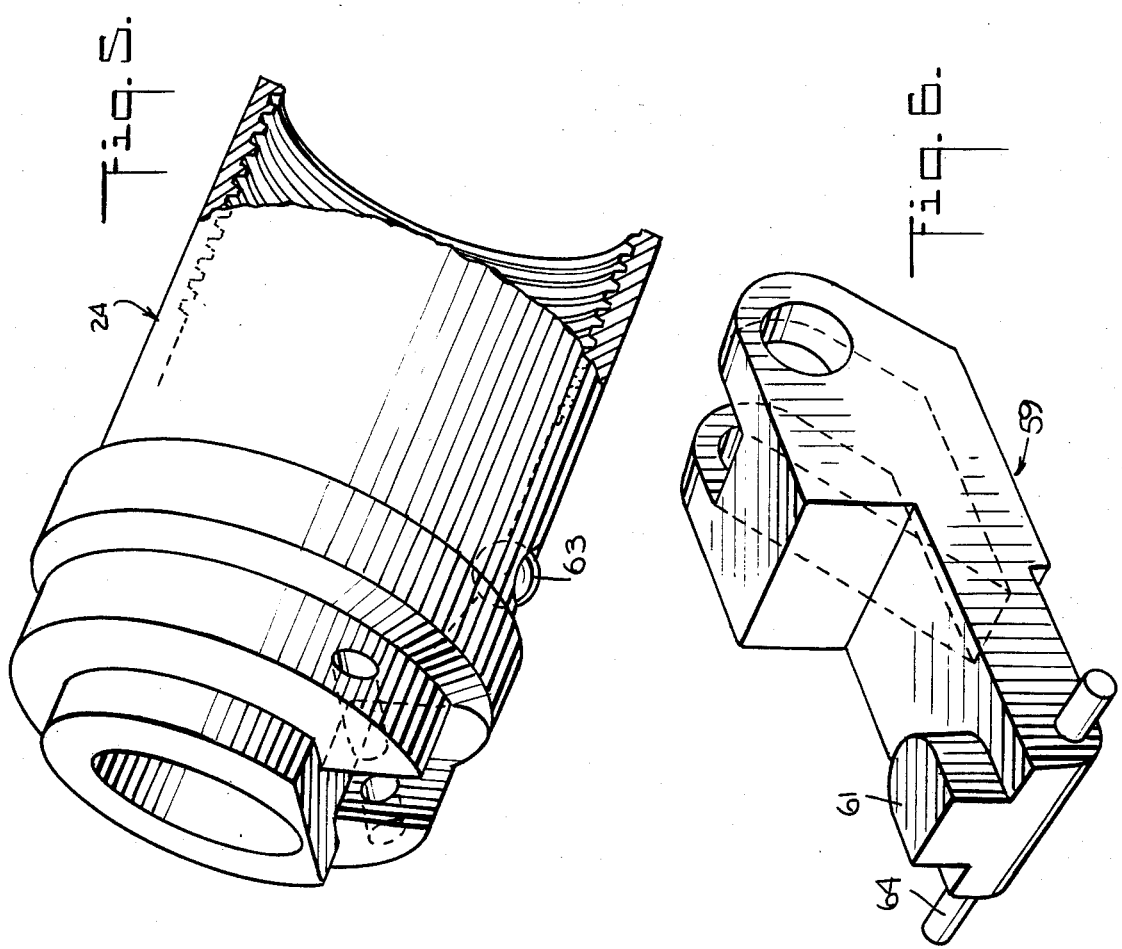

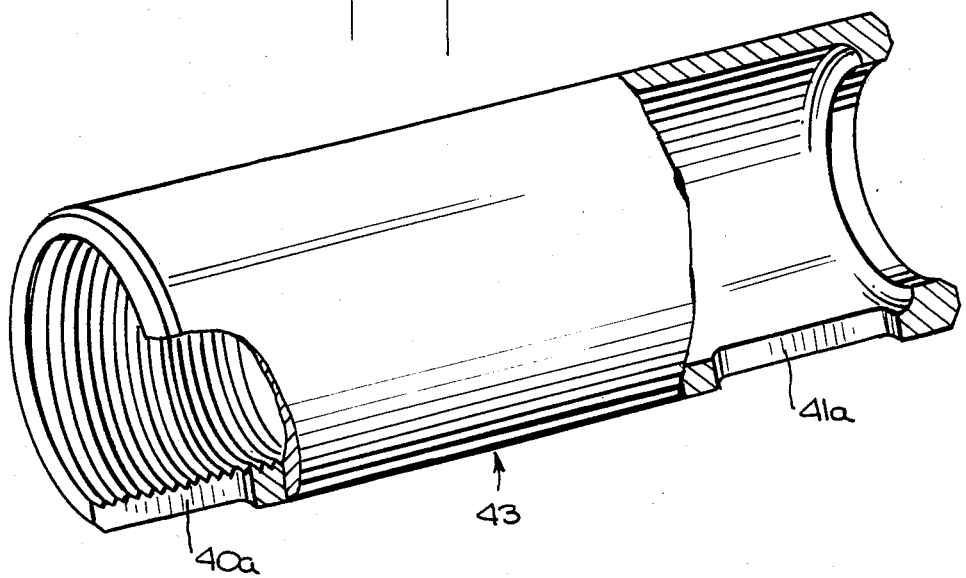
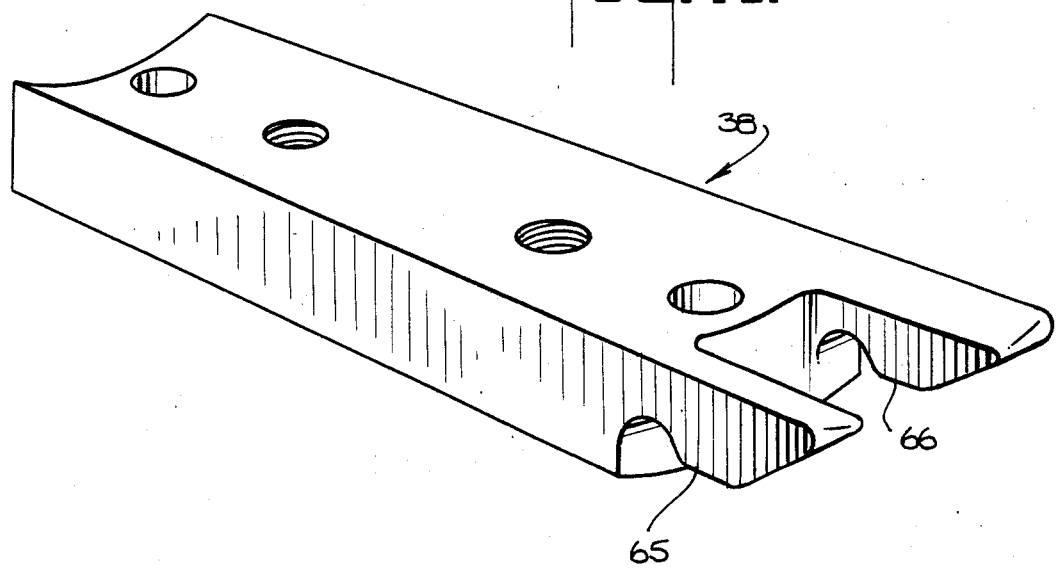

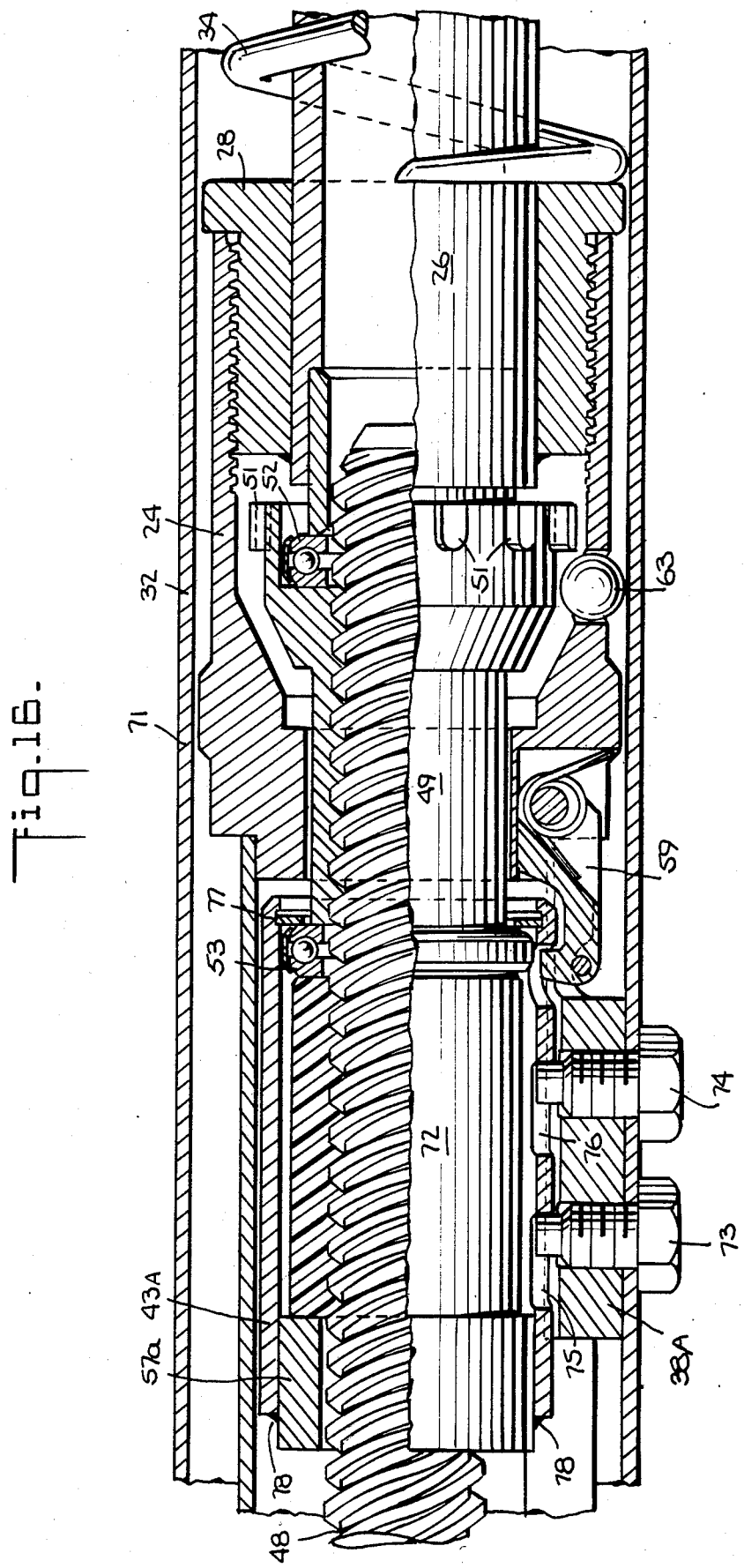

BRAKE SLACK ADJUSTER

This invention relates to adjusters for automatically compensating for excess movement of brake mechanisms and particularly, to automatic slack adjusters used in the rigging of railway cars having a fluid actuated piston and cylinder which operates, through the rigging, the brakes of tne car.

One of the principal uses of slack adjusters of the type to which the invention relates is in the rigging of railway cars where the slack adjuster automatically compensates for brake shoe wear, brake shoe loss, and replacement of brake shoes. Thus, without a slack adjuster, greater displacement of the piston of the air brake cylinder occurs with a reduction in the amount of applied brake force. The maximum displacement is limited by the permissible stroke of the piston which may, for example, be twelve inches for a ten inch diameter brake cylinder. It has been found to be desirable to limit travel of the brake cylinder piston and push rod to about eight inches in customary installations in order to maintain the proper volume and pressure relationship between the brake cylinder and the fluid reservoir, to allow enough slack in the rigging to permit the brake shoes to be free of contact with the wheels while the brakes are released and to allow enough slack in the rigging to permit easy replacement of brake shoes when they are worn out. Thus the slack adjuster must be automatically operative to either reduce or increase the amount of slack in the brake rigging system so as to provide the required travel of the brake cylinder piston push rod at all times.

The slack adjuster must sense the difference between normal piston, short piston and long piston travel. Normal piston travel is the desired piston travel when brakes are set and the push rod travel no longer increases. Normal travel is composed of two parts: clearance travel and elastic travel. Clearance travel, or stroke, is movement resulting from clearance between brake shoes and wheels. Elastic travel is created by lost motion in the rigging, axle and truck clearance and centerplate clearance. This resistance to movement is usually called the elastic stroke of the brake cylinder. The elastic stroke can be as much as two inches of the normal piston travel, which is measured on a standing car. Short cars with simple rigging (two body brake levers) have less elastic stroke than longer cars with four to six body levers. Brake rigging resistance can cause slack adjusters to lock-up before brake shoes are up to the wheels which results in long piston travel. The slack adjuster may measure this as excessive clearance and upon release, all of the elastic stroke is taken up and must be let-out with the next brake application. This action reduces available slack while brakes are released. Any reduction of normal slack in the brake rigging makes it difficult to replace brake shoes and some slack adjusters require manual let-out before the brake shoes can be replaced. Some slack adjusters require the use of a pry-bar between the brake shoe and the wheel to physically force the slack adjuster to let-out in order to gain the clearance taken out in error.

Cars having a high brake level ratio can cause trouble when replacing brake shoes. The brake lever ratio is the total braking force on the car divided by the brake cylinder force. The amount of clearance between the brake shoe and wheel when brakes are released is determined by dividing the piston travel by the brake lever ratio. This figure should normally not be less than 0.53 in. With a smaller amount of brake shoe clearance some difficulty may be encountered when replacing brake shoes. This figure represents the amount of clearance between the brake shoe and wheel at each of the brake shoe locations. The clearance on a standing car truck may be transferred to the other truck by physically pulling the rigging toward the other truck. Thus as much as 4.2 inches ($0.53 \times 8$) of clearance may be used to remove worn brake shoes and to replace at least two brake shoes at a time without the use of air or hand brake power. The brake cylinder elastic stroke is proportional to the load imposed upon the slack adjuster, while the brake cylinder is building up pressure and it occurs after locking up the slack adjuster. False let out occurs before lock-up. It is the purpose of this invention to cut down or even eliminate this affect on the piston travel before locking up the slack adjuster.

At times, a brake shoe or shoes may have fallen out of the rigging allowing the brake cylinder piston travel to increase considerably when brakes on a running car are again applied. The increase can be so great, that the brake cylinder piston could bottom out (twelve inches). In such cases, the function of the slack adjuster is to shorten the distance between its ends, which are attached to the brake rigging, and it is desirable that the full take-up of the excessive slack be accomplished upon release of brakes without applying and releasing the brakes a plurality of times (cycling).

When worn brake shoes, or any of them, are replaced, the slack adjuster must lengthen between its ends or let-out. When brakes shoes are being replaced all the available slack is required, including the elastic stroke clearance some slack adjusters take-out. After shoe replacement, the slack adjuster must lengthen the distance between its ends which are attached to the brake rigging. It is also desirable that this function be accomplished with the first application of brakes on a standing or running car without cycling.

Those concerned with establishing standards for slack adjusters, such as the Association of American Railroads (AAR) have developed the following requirements (AAR Manual of Standards and Recommended Practices, Section E, page E-267 and E-268);

3.1 The automatic slack adjuster shall operate in harmony with the power and hand brake.

3.2 The efficiency loss to brake forces by the use of a slack adjuster will be no less than 300 lbs. minimum, and no more than 435 lbs. maximum, when tested on the AAR standard test rack, with slack adjuster applied in center rod.

3.3 Slack adjuster must be designed to control piston travel to any predetermined standing travel.

3.4 Slack adjuster shall have take-up capacity of at least 19 inches. At 19 inch capacity the length of the slack adjuster (pin center to pin center) must be 84 inches.

3.5 Individual increment of piston travel take-up shall not exceed one inch, with no limitation on number of increments per brake application.

3.6 Slack adjuster shall be designed so that train shocks will not cause false take-up, or let-out of piston travel.

3.12 Slack adjuster shall be designed so that it will not falsely let out slack due to brake rigging resistance. Minimum slack adjuster let-out force shall be 500 lbs. at 17 inches of take-up. (It should be noted that the one inch increment of take up mentioned in 3.5 statement, refers to normal wear, not to shoe removal or loss.)

At present, there are no rules for slack adjuster functions after brakes are set. When brakes are set, all slack adjusters perform as if they were a solid brake rod. Anything that occurs after the brakes are set that increases piston travel will cause the slack adjuster actuating mechanism to go into over-travel. Under certain conditions this over-travel can be greater than many slack adjusters are able to compensate for, and damage to the adjuster and/or brake rigging occurs. It is also desirable to have an over-travel feature built into the slack adjuster which enables the slack adjuster to tolerate removal of four or more shoes at a time for testing the slack adjuster. When shoes are removed, the brake cylinder piston is allowed to exceed its basic eight inch travel when brakes are applied. In some cases even the removal of two shoes will allow the brake cylinder piston to bottom out at twelve inches of travel. The hand brake has sixteen inches of total travel, and is often used instead of the air brake cylinder to pull the floating brake cylinder push rod. This is another four inches of extra piston travel, and therefore, the slack adjuster must operate satisfactorily with a brake cylinder push rod travel of 16 inches, eight of which are normal, leaving a possible eight inch over-travel. It is desirable to have the slack adjuster cope with this over-travel condition, not just the normal over-travel created by wear or emergency brake applications.

Various types of slack adjusters are on the market, but at present, none of them, of which we are aware, meets all the foresaid requirements and has all the aforesaid desirable operating features. For example, for various reasons, they may provide the required shortening ability but take-up and/or let-out in relatively small increments with each cycle of operation, thereby requiring several brake applications for full take-up or let-out. Others can let-out with the first stroke of the brake cylinder piston but take-up in relatively small increments, thereby requiring several brake applications to bring the piston travel back to normal. None, of the prior art slack adjusters to our knowledge, can take care of all conditions described up to this point since none can cope with 8 inches of over-travel. Others are marginal on the let-out force requirements, because they have a variable let-out value, the minimum set forth by the AAR being 500 pounds at 17 inches of take-up. The 17 inch take-up is mentioned since some slack adjusters cannot comply with the 500 pound let out rule beyond 17 inches. It is a purpose of this invention to give a constant, not a variable let-out force throughout the full 19 inch take-up range.

There is not complete agreement in the industry as to what the minimum force should be, and it has been contended that the force should be at least 1,000 pounds. Since the AAR rule may be changed, the slack adjuster of this invention may, with a simple modification to its present parts, let-out to a predetermined brake force, such as a force in the range of 500 to 1,500 pounds, without a complete redesign of the slack adjuster.

The AAR requirement of an efficiency loss of not less than 300 pounds nor more than 435 pounds can be met only marginally, or with difficulty, by some prior art slack adjusters. In one case, the efficiency of the slack adjuster had to be reduced to meet the 300 pounds minimum. Other prior art slack adjusters barely meet the 435 pound maximum. These efficiency standards were established so that railroads would not be forced to redrill the body brake rigging levers each time that the railroad replaced the slack adjuster of one manufacturer with the slack adjuster of another manufacturer. The efficiency loss, at present, is checked on the standard AAR test rack, with the slack adjuster applied in the center rod. The AAR considers only the loss at the optimum eight inch basic travel. With overtravel, most, if not all, the prior art slack adjusters will exceed the maximum of 435 pounds. One of the objects of this invention is to keep the efficiency loss as low as the AAR rules will allow and still keep the efficiency loss developed with over-travel close to the 435 pound limit.

Some of the prior art slack adjusters do not have enough over-travel tolerance built into them, and because of this the control rod will either break or bend. Either condition will create an increase in the basic eight inch piston travel. A bent control rod may not be readily detectable upon normal inspection of the car. The inspector might pass the car, for interchange, even with long piston travel, since he assumes the slack adjuster will bring the travel back to normal upon release of the brake. This may continue at each yard until the car goes in for major repairs. Long piston travel means the car is not doing its proper share in braking the train. Prior art slack adjusters using clutches without positive locks can have the clutches rust up and slip when they are meant to hold. Once they start to slip the piston travel will increase. The slippage can be enough to allow the brake cylinder to bottom out. Upon release of the brakes, the shoe and wheel clearance slack is reduced a corresponding amount. It is possible to take-up all the brake shoe and wheel clearance and have brake shoes dragging against the wheels in a brake release mode, due to clutch slippage.

Other objections to at least some of the commercially available slack adjusters are one or more of the following:

1. The amount of take-up or let-out per brake application is not enough to remove or let-out all the slack in one brake application;
2. A substantial number of parts, including a plurality of coil springs applying relatively large forces, are required to meet the let-out requirement;
3. Water condenses readily on moving parts within the housing and interferes with operation if the condensate freezes;
4. An excessive number of clutches and friction clutch locking, rather than positive locking, of the adjuster is used. Slippage of friction clutch locking creates long piston travels.

One object of the invention is to provide a slack adjuster which has provision for an adjustable let-out force which can be at least 1,000 pounds;

Another object of the invention is to eliminate as much of the so-called elastic stroke as possible before locking up the slack adjuster;

Another object of the invention is to stop the removal of the elastic stroke slack and subsequently letting it out upon application of the brakes;

Another object of the invention is to have a slack adjuster capable of handling a large amount of over-travel which prior art slack adjusters are incapable of handling;

A further object of the invention is to provide a slack adjuster which will never allow short piston travel when brakes are first applied and will provide the desired takeup adjustment upon release of the brakes even though the adjustments are relatively large and larger than the adjustments which can be made with one brake application with some of the prior art slack adjusters.

A still further object of the invention is to provide a slack adjuster which is not subject to the objections set forth hereinbefore.

In all the embodiments of the invention, a load screw which may be secured at one end to one part of the brake rigging is connected through a load nut to a load housing which may be connected at its other end to another part of the rigging. A control cage which encloses a control nut on the load screw co-operates with an actuator tube which is coaxial there with and which is operable by a known type of actuator lever responsive to the brake rigging condition to release the load screw when the slack adjuster is to be lengthened and to pull the load screw into the load housing when the slack adjuster is to be shortened.

In the preferred embodiment of the slack adjuster of the invention, the control cage encloses a control nut, on the threads of the load screw, which has ratchet teeth on an end face, which are pressed by spring washers toward the ratchet teeth on an end face of a control nut indexer. The force required to rotate the control nut in one, the let-out direction, is determined by the amount of engagement of the ratcheting teeth, and the control nut is permitted to rotate in either direction, only when a pin carried by a camming bar on the actuator tube is out of engagement with the peripheral teeth on the control nut indexer. Thus, to shorten the slack adjuster, the actuator permits the control nut and control nut indexer to rotate and move toward the rigging end of the load screw upon application of the brakes and prevents rotation of the control nut and control nut indexer upon release of the brake, pulling the load screw into the slack adjuster.

In another, simpler embodiment, the control cage encloses a friction control nut on the threads of the load screw, and the friction between the control nut and the face of the non-rotatable cage determines the force required to rotate the friction control nut as well as the friction created between the load screw thread and the friction control nut thread in the let-out function of the slack adjuster. On take-up, the force of the control rod on the actuator tube moves the non-rotatable cage away from the friction control nut, a very small amount, allowing the latter to rotate freely on the load screw threads. The movement of the friction control nut measures the amount of wear, over-travel, etc. which takes place while the brakes are set. Upon release of the brakes, the friction control nut engages the face of the non-rotatable cage and the friction between the friction control nut and the non-rotatable cage along with the thread friction, stops the nut from rotating as the control spring expands and pulls the load screw into the slack adjuster.

In both embodiments, a load nut on the threads of the load screw and having peripheral teeth and a frusto-conical surface locks up with respect to the load housing at the proper time in the brake application. In the locked position of the load nut, the frusto-conical surface thereof engages a corresponding surface on the load housing to act as a brake, to prevent rotation of the load nut. However, the frusto-conical surfaces on the load nut and the corresponding surface on the load housing may be omitted if desired. A ball carried by the actuator tube also enters between the peripheral teeth of the load nut and acts between the latter and the load housing to lock the load nut against rotation. However the main purpose of the ball is to insure against slippage of the conical surface because slippage creates long piston travel and results in reduced brake shoe and wheel clearance.

Also, in both embodiments, a pawl pivotally mounted on the load housing engages the control cage and holds the control cage in a fixed axial position with respect to the load housing except when the pawl is disengaged from the control cage by movement of the cam surface on a member carried by the actuator tube. The pawl is used because as tension sets up in the brake rigging, the slack adjuster wants to extend in length. Without the pawl, the let-out force would be only that of the pre-compressed control spring, not the 500 pound AAR requirement.

The illustration of friction forces and spring forces given hereinafter are based on the assumption that the letout force must be a minimum of 1,000 lbs., but it will be understood that the friction and spring forces may be different if the AAR rules change.

Other objects and advantages of the present invention will be apparent from the following detailed description of the presently preferred embodiments hereof, which description should be considered in conjunction with the accompanying drawings in which:

FIG. 3 is a side elevation view, partly in crosssection, of the preferred embodiment of the slack adjuster shown in FIGS. 1 and 2 and shows the parts in a brakes released position;

FIG. 4 is a perspective view, approximately full size, of the cone lock load nut shown in FIG. 3;

FIG. 5 is a perspective view, partly in cross-section, of the load housing (approximately full size except for length) forming part of the slack adjuster shown in FIG. 3;

FIG. 6 is an enlarged, perspective view of the pawl forming part of the slack adjuster shown in FIG. 3;

FIG. 7 is a perspective view, partly in cross-section, of the control cage (approximately full size) forming part of the slack adjuster shown in FIG. 3;

FIG. 10 is an enlarged, perspective view of the camming bar which forms part of the slack adjuster shown in FIG. 3;

FIG. 16 is a fragmentary view, partly in cross-section, of an alternative embodiment of the slack adjuster of the invention.

Although it is well known in the art to install a brake slack adjuster in various parts of the brake rigging of a railway car (see, for example, U.S. Pat. Nos. 3,543 889; 3,442,358; 3,454,140 and 2,767,811), the slack adjusters of the invention will be described in connection with an installation of the type illustrated in FIG. 1, it being understood that the slack adjuster of the invention may be installed in other arrangements, such as, the arrangement shown in FIG. 2.

Figure 1:
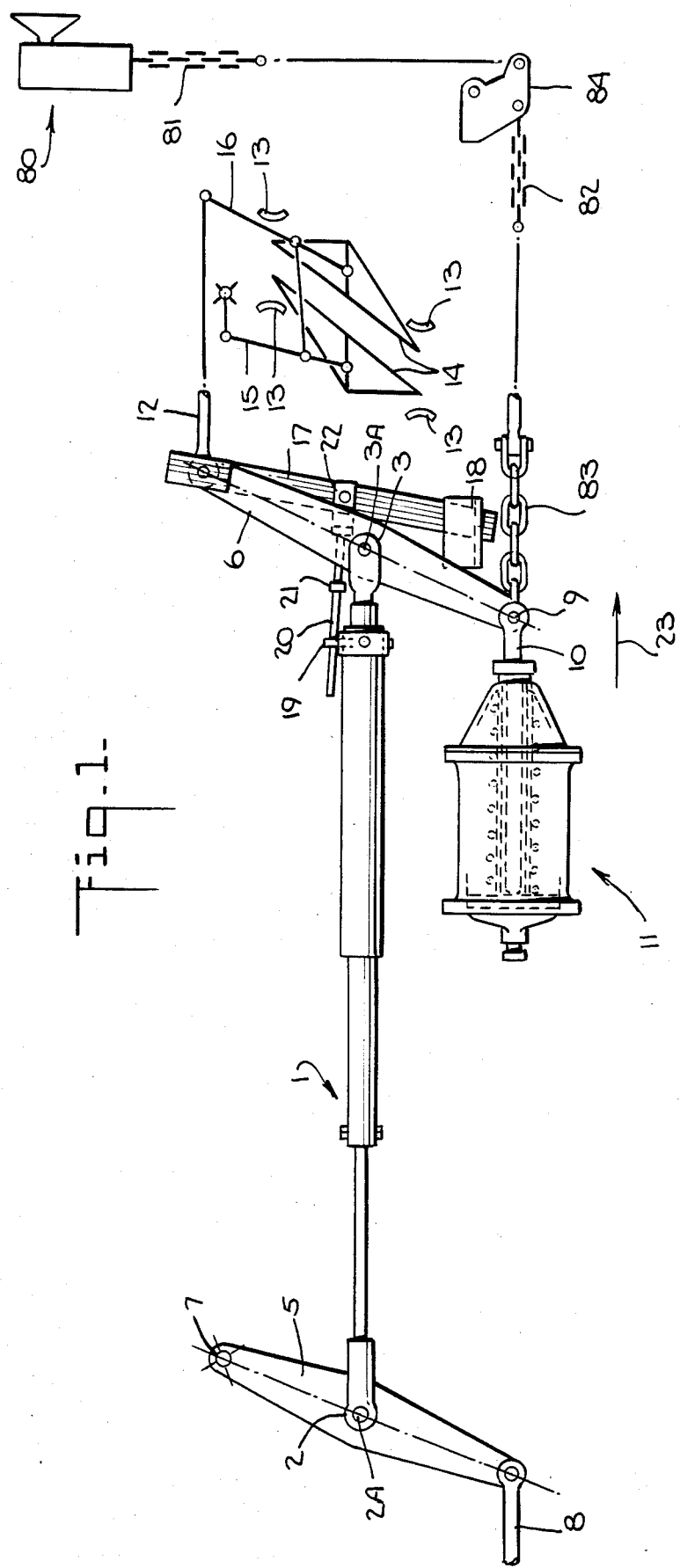
FIG. 1 is a diagrammatic, plan view of a portion of a railway car brake rigging including brake levers, a slack adjuster and its activator assembly and air cylinder and piston assembly, along with a floating push rod.

FIG. 1 illustrates diagrammatically one known type of brake slack adjuster installation with the components in the AAR preferred location and in the positions assumed thereby at zero piston travel, brakes released condition. The installation comprises adjuster 1 connected at its opposite ends 2 and 3 to intermediate points 2a and 3a on pivotable levers 5 and 6. The lever 5 pivots around the axis of a fulcrum pin 7, and at its opposite end, it is pivotally connected to a brake rod 8 which, at its opposite end, connects to conventional mechanisms which move brake shoes toward and away from the wheels of a railway car.

The lever 6 is pivotable around the axis of pin 9 which connects it to the floating piston push rod 10 of an air cylinder and piston assembly 11. The opposite end of the lever 6 is, pivotally connected to a brake rod, 12 which similarly to the rod 8, activates other brake shoes 13 and brake beams 14 of the car through a conventional mechanism, shown schematically, and including levers 15 and 16.

An actuator lever 17 is also pivotally connected to the lever 6 at the end thereof to which the rod 12 is connected, and at its opposite end, in the direction of its length, i.e., transversely to the length of the car, the lever 17 is loosely received in a fixed bracket 18 so that the lever 17 is permitted to move a small amount at said opposite end in the direction of the length of the railway car and is also permitted to move in the direction of its length. As is known in the art, the position of the actuator lever 17 is a measure of the slack in the brake rigging, and if there is sufficient slack in the brake rigging, the actuator lever 17 will position a collar 21, adjustably mounted on a rod 20, against, or substantially against, a trigger 19 on the slack adjuster 1, whereas when there is too little slack in the brake rigging, the position of the actuator 17 will be such as to cause the collar 21 to be spaced from the trigger 19 by an amount corresponding to the amount of insufficient slack.

The trigger 19 of the slack adjuster 1 slidably receives the control rod 20, and the control rod 20 is pivotally connected at 22 to the actuator lever 17.

The cylinder and piston assembly 11 is mounted in a fixed position on the railway car, and in FIG. 1 the push rod 10 can be moved by the brake cylinder and piston assembly 11 or by the hand brake 80 in the direction indicated by the arrow 23. The conventional hand brake 80 and its conventional connections to the push rod 10 by chains 81, 82 and 83, a pivotable lever 84, and are diagrammatically shown. Brakes are released by the movement of the push rod 10 back into the brake cylinder assembly 11 as the air is released from the brake cylinder, of when the hand brake is released. As is known in the art, the cylinder and piston assembly 11 has a limited amount of movement i.e. twelve inches for a ten inch cylinder, and is moved by supplying air to the assembly 11 from a tank having a limited supply of air. In view of the latter, the force applied to the brakes decreases as the push rod 10 moves out of the brake cylinder. Accordingly, to keep the braking forces relatively constant, it is necessary to make the stroke of the push rod 10 substantially the same for each brake application, and the function of the slack adjuster is to compensate for changes in the amount of slack of the brake rigging due to wear of the brake shoes, the rigging, etc. or loss or replacement, due to wear, of the brake shoes. Brake slack adjusters are well known in the art, and for various reasons, the AAR sets standards for brake slack adjusters. Thus, the standards indicate that a slack adjuster should be able to shorten by at least nineteen inches and must control the travel of the push rod 10 whether the source of power is the air cylinder and piston assembly 11 or the hand brake 80. In addition, for interchangeability reasons, the adjuster is limited in size and must be connectible between two points, such as the points 2a and 3a, seven feet apart.

It will be observed, from an examination of FIG. 1, that if the movement of the push rod 10 tends to increase beyond normal for the reasons described hereinbefore, the adjuster 1 must shorten, or take-up, to compensate and conversely, if worn parts, i.e. brake shoes, are replaced, the adjuster 1 must lengthen or let-out. Such let-out is normally responsive to the force applied to the adjuster 1 in a direction tending to move the points 2a and 3a farther apart, and if the brake rigging is sticking for some reason, i.e. the presence of foreign materials such as coatings, ice, etc., the adjuster 1 would normally respond as though it were too short, i.e. it would let-out. It has been established by the AAR that a slack adjuster shall not let-out until the force tending to lengthen the slack adjuster is at least 500 pounds. The slack adjuster of the invention will let-out only after 1,000 pounds of force has been reached, but it will be apparent to those skilled in the art that the parts may be selected so as to provide let-out at a lower amount of force. 1,000 pounds of force is enough, in most cases, to bring the brake shoes in contact with the wheels.

As mentioned hereinbefore, it is also desirable that large compensating changes in the length of the slack adjuster 1 take place either on application or release of the brakes rather than in several applications or releases of the brakes. In the embodiments of the invention described hereinafter, a large change in the length of the slack adjuster I can be accomplished with a single application of the brakes, and the let-out force required can be set substantially as desired and be at least 1,000 pounds with no reduction in the braking force due to the slack adjuster mechanism except for the required efficiency loss of 300 pounds.

Figure 2:
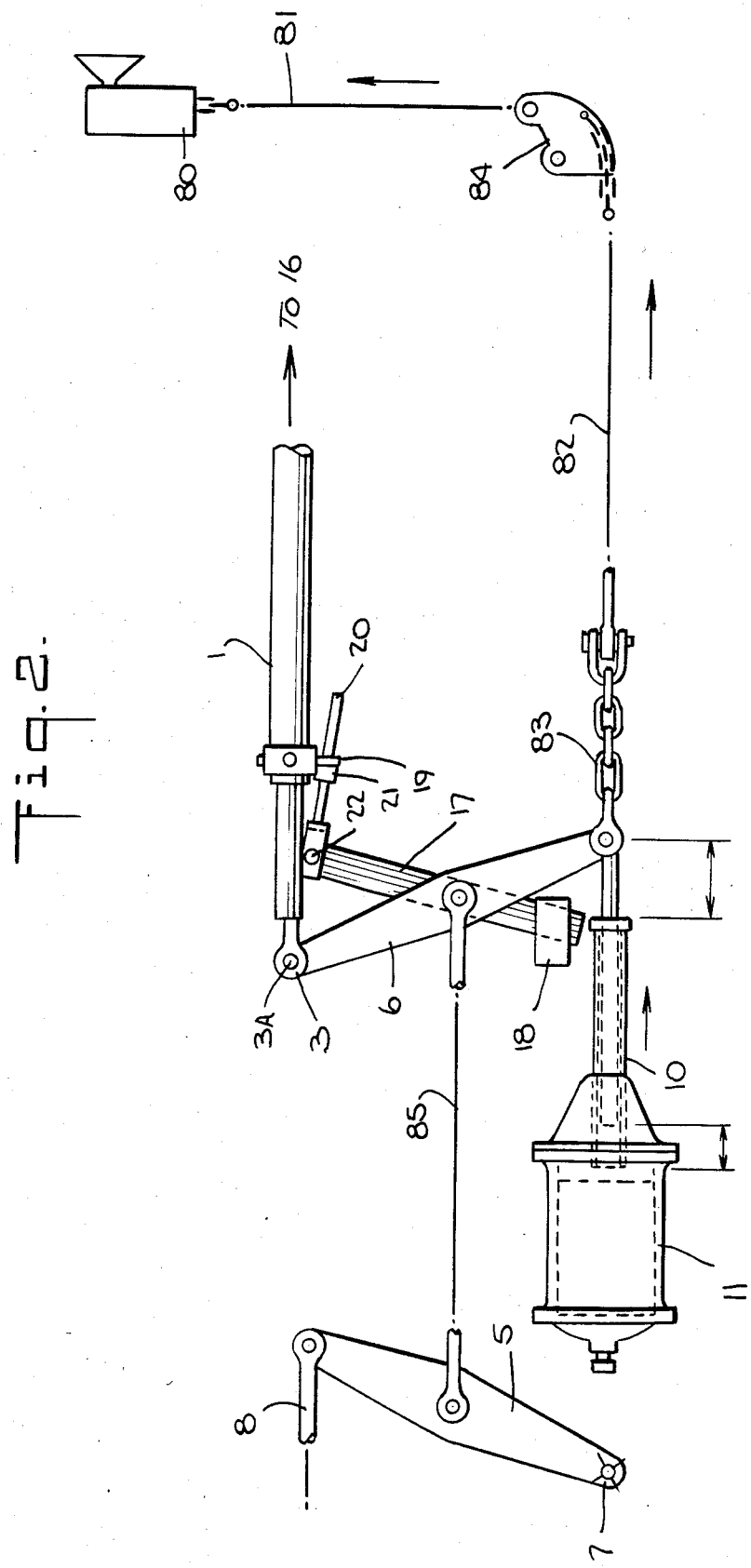
FIG. 2 shows, in a diagrammatic, plan view, the slack adjuster in a top rod application which is sometimes used due to the design of the car.
Figure 8:
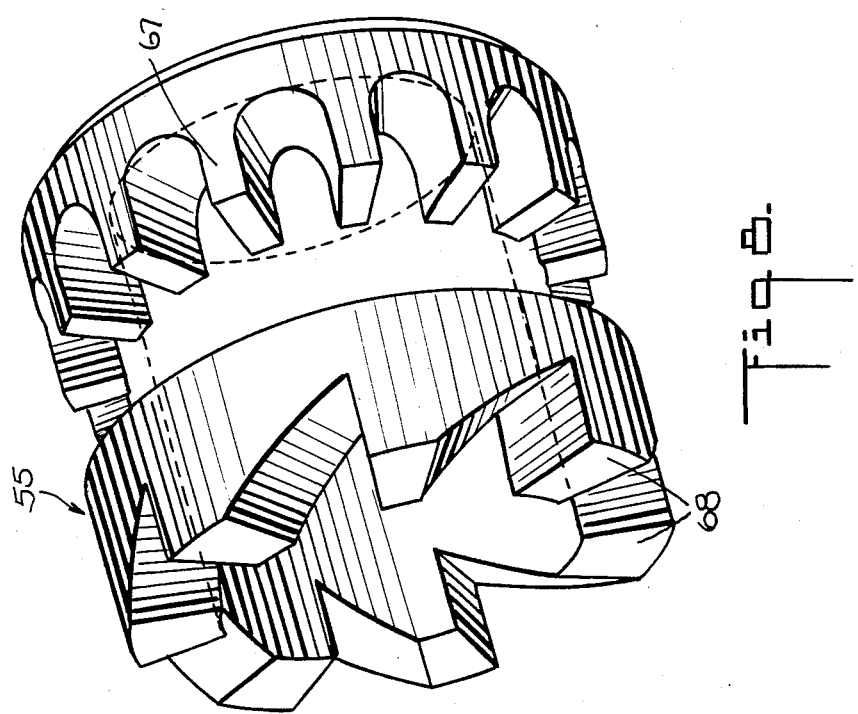
FIGS. 8 and 9 are enlarged, perspective views of the control nut indexer and the control nut respectively, which form part of the slack adjuster shown in FIG. 3.
Figure 9:
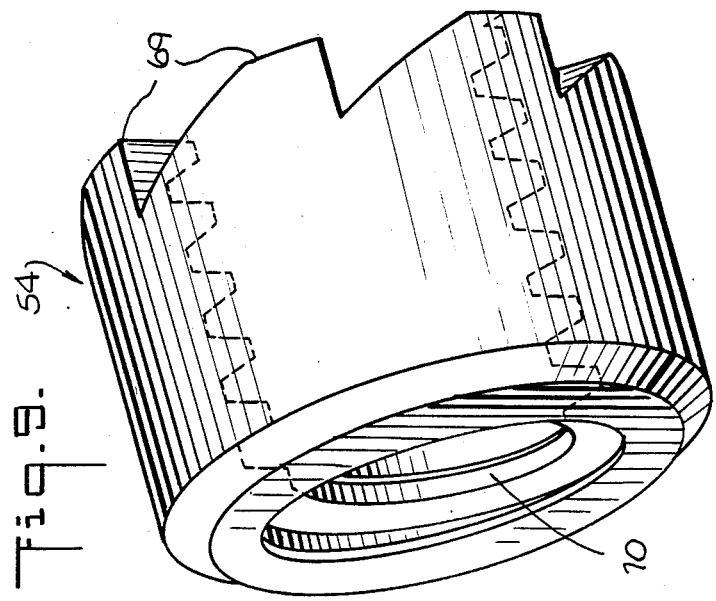

FIG. 2 Illustrates diagrammatically the same slack adjuster applied in a top rod. It illustrates the brake cylinder piston in the bottomed out 12 inch position and the push rod is illustrated at the 16 inch travel position, being pulled out by the hand brake. The pin 3a and trigger 19 relationship under these conditions illustrates why more over-travel is needed than the prior art slack adjusters allow. Parts shown in FIG. 2 which correspond to the parts shown in FIG. 1 are identified by the same reference numerals. In FIG. 2, the rod 12 of FIG.

1 is replaced by the slack adjuster 1, the slack adjuster 1 of FIG. 1 is replaced by a rod 85, the lever 6 of FIG. 1 is pivotally connected at one end to the slack adjuster 1 rather than to the rod 12 and the actuator lever 17 is pivotally connected at one end to the control rod 20 instead of to the rod 12. The operation of the apparatus shown in FIG. 2 is similar to the operation of the apparatus shown in FIG. 1 and will be readily apparent to those skilled in the art. In FIG. 3, the slack adjuster 1 is shown in its relaxed, or brakes released, position. The slack adjuster 1 is in its fully extended condition and can take-up by at least 19 inches. In the embodiment of the slack adjuster 1 illustrated in FIGS. 3–15, a jaw 3, at one end, is secured to a load housing or second load member 24 in any desired manner, but preferably, the jaw 3 has a threaded portion 25, the threads of which mate with the threads on a load tube 26 which has a screw guide 26a, and which is circumferentially welded at 27 to a collar 28 having exterior threads which mate with internal threads on the load housing 24. After the jaw 3 is assembled with load tube 26, relative rotation thereof is prevented by a cotter pin 29 which passes through the jaw 3 and is received in cotter pin hole 30 at the end of the load tube 26. The trigger 19 is secured by welding to a collar 31 which is secured to an actuator member or tube 32, preferably, by means of bolts 33 so that the circumferential position of the trigger 19 may be changed as required for different installations. The control rod 20 is slidably received in an opening in the trigger 19, and the collar 21 is adjustably secured to the rod 20. Collar 21 is welded to rod 20 at installation of the slack adjuster into the rigging, once the desired piston travel has been established.

A helical spring 34 surrounds a portion of the load tube 26 and bears, at one end, on a washer 35 which bears against an oil-filled, annular, lubricating pad 36 which bears against the retainer 37 held in place by the bolts 33. The high density, lubricating pad dispenses oil as the control spring is compressed, keeps ice from clinging to the load tube and keeps moisture out of the actuator tube 32; At its opposite end, the spring 34 bears against the collar 28 which is threaded into the load housing 24. The actuator tube 32 is prevented from rotating with respect to the load housing 24, after assembly, by means of a camming bar 38 (see FIGS. 3 and 10) which is secured to the actuator tube 32 by bolts 39 and which has pins 40 and 41 extending therefrom. The pins 40 and 41 act as brake release means as described hereinafter.

The load housing 24 has a tubular extension 42, with a long slot 42a, which serves as a guide for the camming bar 38 and allowing the camming bar to move up to 8 inches for over-travel, wear, etc. The extension 42 acts as a housing for a control cage 43 (see FIGS. 3 and 7), forming part of braking means hereinafter described. The extension 42 has an actuator tube closure 44 secured to it by welding. Preferably, an oil-filled, lubricating pad 45 surrounds the extension 42 and is received between the closure 44 and a retainer 46 which is also secured to the tube 42 by welding. The high density, oil soaked pad 45 keeps the actuator tube 32 from freezing up by rust or ice and keeps water out. The extension 42 is closed at its left end, as viewed in FIG. 3, by a collar 47 secured thereto, by bolts 47a. The collar 47 slidably receives the unthreaded portion of a load screw or first load member 48 to which the jaw 2 is secured, such as by welding. The collar 47 is applied to the load screw 48 before welding of the jaw 2 thereto.

The load screw 48 may, for example, be made of steel, be approximately 57 inches long from jaw pin hole 2a to end of screw and have full threads for approximately 27 inches of its length. The 4 start threads may be rolled threads with an axial pitch of 0.3125 inches and a helix angle of 19 degrees, 58 minutes and 40 seconds. The outside diameter, pitch diameter and root diameters of the threads may be, respectively, about 1.2135 inches, 1.097 inches, and 0.967 inches.

Within the load housing 24, there is first braking means comprising a cone lock load nut 49 (see FIGS. 3 and 4) having a peripheral surface 50, in the shape of a truncated cone, and having a plurality of teeth 51 extending therefrom. The surface 50 is engageable with a corresponding surface 50a on the load housing 24.

The end of the load tube assembly 26 is engageable with a bearing 52 (FIG. 3) mounted in one end of the load nut 49, and the opposite end of the load nut 49 is engageable with a bearing 53 mounted in one end of the control cage 43.

Inside the control cage 43, there is second braking means comprising a control nut 54 (see FIGS. 3 and 9) rotatably mounted load screw 48 and held between a face of a control nut indexer 55 (see FIGS. 3 and 8) and a bearing 56. A cage index nut 57 has external threads which mate with internal threads on the control cage 43. The spring washers 58, such as "Belleville" washers are mounted, and act, between the index nut 57, bearing 56 and the control nut 54. The index nut 57 is used to precompress the spring washers. The spring washers require precompression in order to function properly.

Because of slots 40a and 41a, the control cage 43 is axially slidable with respect to the pins 40 and 41, but such pins 40 and 41 prevent rotation of the control cage 43 and are respectively received between teeth on the cage index nut 57 and on the control nut indexer 55.

FIG. 3 illustrates the relative positions of the parts before the slack adjuster is installed which is the same as the installed brakes released position. In both embodiments of the invention, the dimensions of the slack adjuster are such that the points 2a and 3a are seven feet apart, and the left end of the load screw 48 (as viewed in FIG. 3) can move to the right approximately nineteen inches. The movement of the actuator tube 32 is to the left when compressing the spring 34. The spring 34 is fully compressed with approximately eight inches of over-travel. In the embodiment shown the spring 34 is pre-compressed so that a force of over about 322 pounds is required to compress it further. The spring 34 may, for example, have a mean diameter of 2¾ inches and be made of 5/16 inch spring wire of ASTM A-229 type 1 material with twenty-three and one-half active coils and a free height of 27-15/16 inches. The spring rate may be 28 pounds per inch and have a fiber stress of 125,000 pounds, and the spring 34 is compressed to about 16-7/16 inches in length when installed. However, the spring 34 may have different dimensions and characteristics depending upon the operating characteristics desired. The outside diameter of the actuator tube 32 may be approximately 3½ inches which is smaller than most slack adjusters.

Releasable means in the form of a pawl 59 (FIGS. 3 and 6) is pivotally mounted by a pin 60 on the load housing 24 (FIGS. 3 and 5) and has a tooth 61 which is urged into engagement with a portion of the control cage 43, to prevent movement thereof to the left. As shown in FIG. 3, a spring 62 is mounted on the pin 60. A pin 64 extends through and from the pawl 59 and is engageable with the cam surfaces 65 and 66 on the camming bar 38 (FIGS. 6 and 10) which acts as pawl release means so that the tooth 61 becomes disengaged from the control cage 43 when the actuator tube 32 moves to the left with respect to the load housing 24, as viewed in FIG. 3.

A ball 63 rides on the actuator tube 32 and extends through an opening, larger than the ball 63, in the load housing 24 so that when the load nut 49 moves sufficiently far to the left, as viewed in FIG. 3, the ball 63 enters between the teeth 51 of the cone lock load nut 49 and prevents rotation of the load nut. The control nut indexer 55 and the control nut 54 are illustrated in greater detail in FIGS. 8 and 9. The control nut indexer 55 has a plurality of first teeth 67 for receiving the pin 41 (FIG. 3) there between, and when the pin 41 is received between a pair of of the teeth 67, the control nut indexer 55 is prevented from rotating.

The control nut indexer 55 has a plurality of second teeth 68 on an end face thereof which mate with the teeth 69 on an end face of the control nut 54 which has internal threads 70 which mate with the threads on the load screw 48. When the control nut indexer 55 is prevented from rotating by the pin 41, the control nut 54 and control nut indexer 55 cannot rotate. If sufficient tension force is applied to the control nut 54, by the non-rotatable load screw 48 the teeth 69 move away from the teeth 68 permitting the nut 54 to rotate counterclockwise as viewed from the left end of FIG. 9. The amount of the force required to rotate the control nut 54 depends upon the force applied thereto by the spring washers 58 (FIG. 3).

The slack adjuster 1 may be assembled by assembling the control cage 43 and the parts interior thereof and by adjusting the cage indexing nut 57 until the spring washers 58 exert substantially 300 pounds of force between the bearing 56 and the cage nut 57. Thereafter, the control cage 43 assembly is inserted into the tubular extension 42 of the load housing.

The camming bar 38 is placed in the elongated slot 42a of the extension tube 42, and on top of the control cage assembly 43. The pins 40 and 41 are then placed into the camming bar 38 and into the slots 40a and 41a of the control cage assembly. Pin 41a also must pick up a tooth 67 on the control nut indexer 55. The pawl 59, the pawl pin 60, the pawl spring 62 are then secured to the load housing 24. The camming bar 38 pin and cage assembly are then pushed to the right in the slot 42a until the pawl 59 is lifted and locked into place in the control cage assembly. The control cage assembly can no longer rotate or move in the slot 42a without activation of some type. The oil filled lubricating pad 45 may be applied at this time between the closure 44 and retainer 46.

The cone lock load nut 49 with its bearing 52 are placed in the load housing 24 as shown in FIG. 3. The ball 63 may also be put in place in the load housing 24 at this time. The load tube 26 with its collar 28 and the screw guide 26a may now be screwed into the load housing assembly. Next the actuator tube 32 is slid over the load housing 24 assembly. The camming bar 38 is then fastened to the actuator tube 32 by means of the bolts 39. Thereafter, the load screw 48, which has had the end closure 47 subassembled at the time the jaws 2 were welded to the load screw, is screwed into the control nut 54, which now cannot rotate, and into the cone lock load nut 49 and bearing assembly until it reaches approximately the position shown in FIG. 3.

Then the retainer 37, the washer 35, the lubricating pad 36, and the spring 34 are inserted into the actuator tube 32 over the load tube 26. By then pressing on the retainer 37, while holding the actuator tube 32, the spring 34 is compressed, and the trigger 19 and the retainer 37 are secured in place by means of the bolts 33. The jaw 3 may now be screwed into the load tube 26 and the cotter pin 29 can be applied to prevent rotation of the jaw 3, thereby to maintain a proper jaw 3 and trigger 19 relationship.

FIGS. 11–15 illustrate the positions of the various parts of the slack adjuster 1 as it operates during use and assuming that the jaws 2 and 3 have been connected, respectively, to the levers 5 and 6 of a brake rigging on a railroad car, the control rod 20 and the trigger 19 being omitted in FIGS. 11–16 for ease in illustration.

Figure 11:
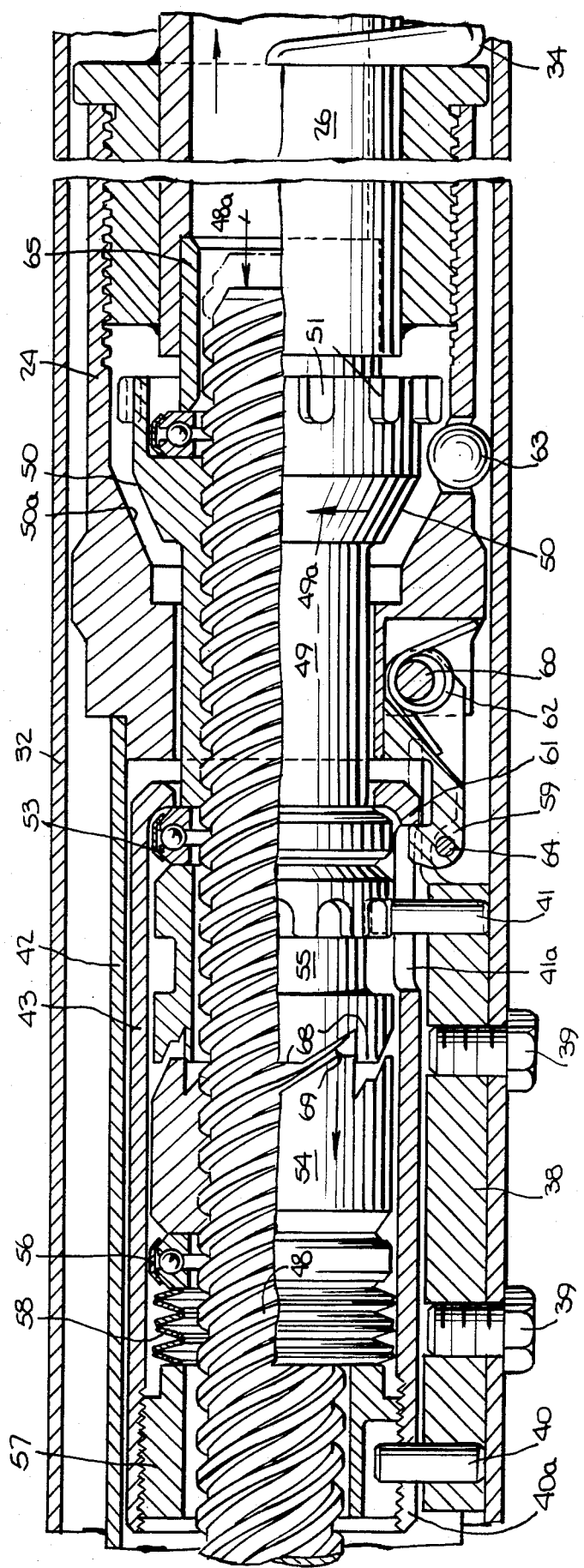
FIG. 11 is an approximately full size, fragmentary cross-sectional view of the slack adjuster shown in FIG. 3, and illustrates the positions of parts as the brake cylinder builds up pressure due to rigging resistance.

Briefly summarizing the operation of the slack adjuster 1, the control nut 54 and control nut indexer 55 are, in FIG. 11, trying to spread apart, compressing the spring washers 58. The spring washers 58 are shown compressed enough to overcome the rigging resistance (approximately 900 pounds of compression), but not enough to allow the slack adjuster 1 to let-out. This is enough force to overcome the previously mentioned rigging resistance in most cases. It takes a 1,050 pound force and about 0.15 inch of spring washer compression, in the embodiment described, before the slack adjuster will let-out. The rotation of the load nut 49 and the movement of the non-rotatable load screw 48 are indicated, respectively, by the arrows 49a and 48a in FIG. 11. Once the rigging resistance has been overcome the load screw 48 returns to its original location, and the load nut 49 rotates in reverse to its original position. If the brake shoe and wheel clearance is such that the slack adjuster 1 must let-out, the rigging resistance becomes greater than 1050 pounds early in the stroke of the push rod 10, FIGS. 1 and 2. The control nut 54 will pull away from the control nut indexer 55 due to the load screw being pulled out of the slack adjuster. In the embodiment described, at 0.15 inch compression of the spring washers 58, the control nut 54 will rotate and change its position on the load screw 48. The control nut 54 will continue ratcheting over the teeth 68 (allowing the load screw 48 to pull out) until the brake cylinder piston stroke allows the actuator collar 21 to come into contact with the slack adjuster trigger 19.

Figure 12:
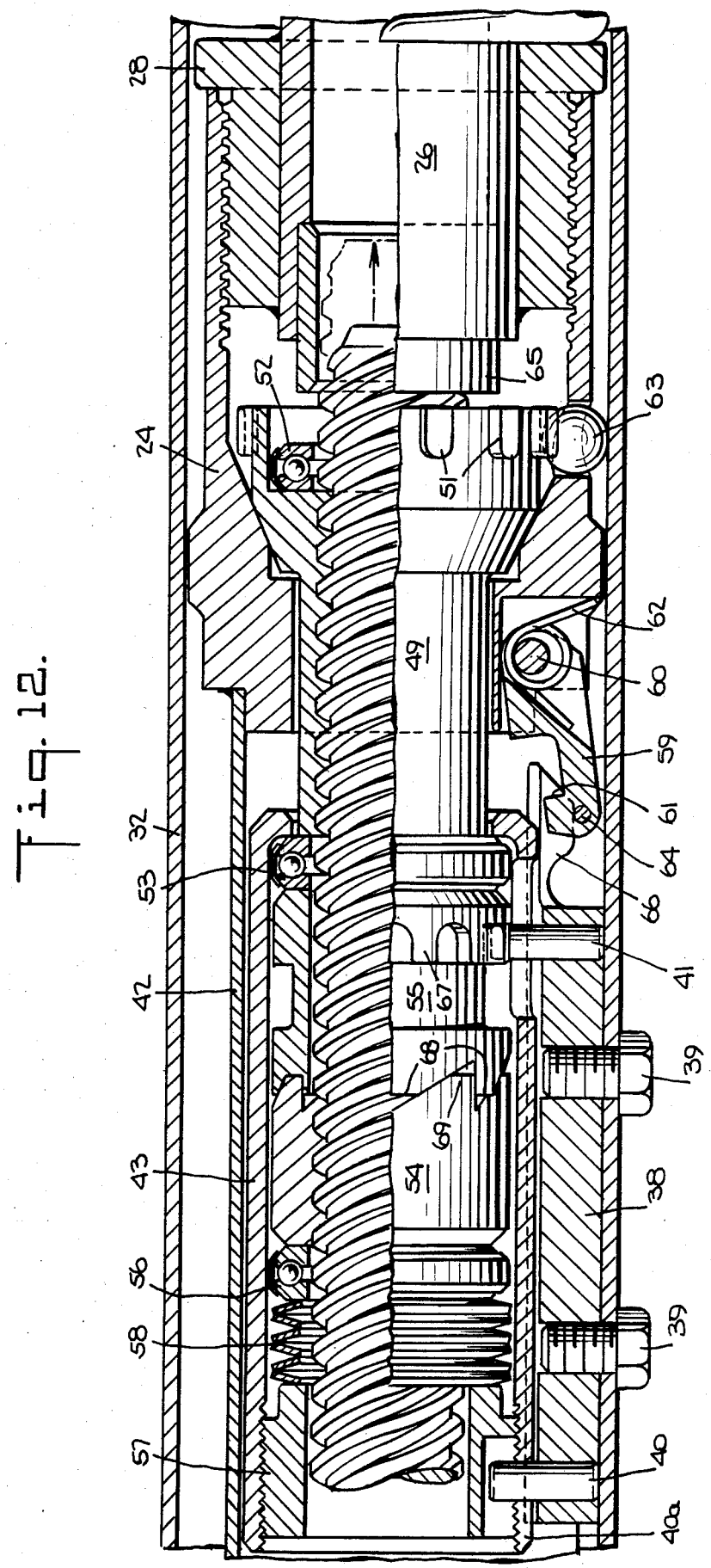
FIG. 12 is an approximately full size, fragmentary, cross-sectional view of the slack adjuster shown in FIG. 3 and illustrates the positions of the parts after the brakes are initially set, (positioned), and the slack adjuster first locks up and is ready to measure wear.

In FIG. 12, which illustrates the position of the pawl after the brakes are initially set and the slack adjuster 1 first locks up and is ready to measure wear and/or overtravel, the spring washers 58 are no longer compressed by rigging resistance, and the slack adjuster 1 has increased in length by aproximately seven-sixteenths of an inch. However this extension is removed upon release of the brakes without removing any of the predetermined slack.

Figure 13:
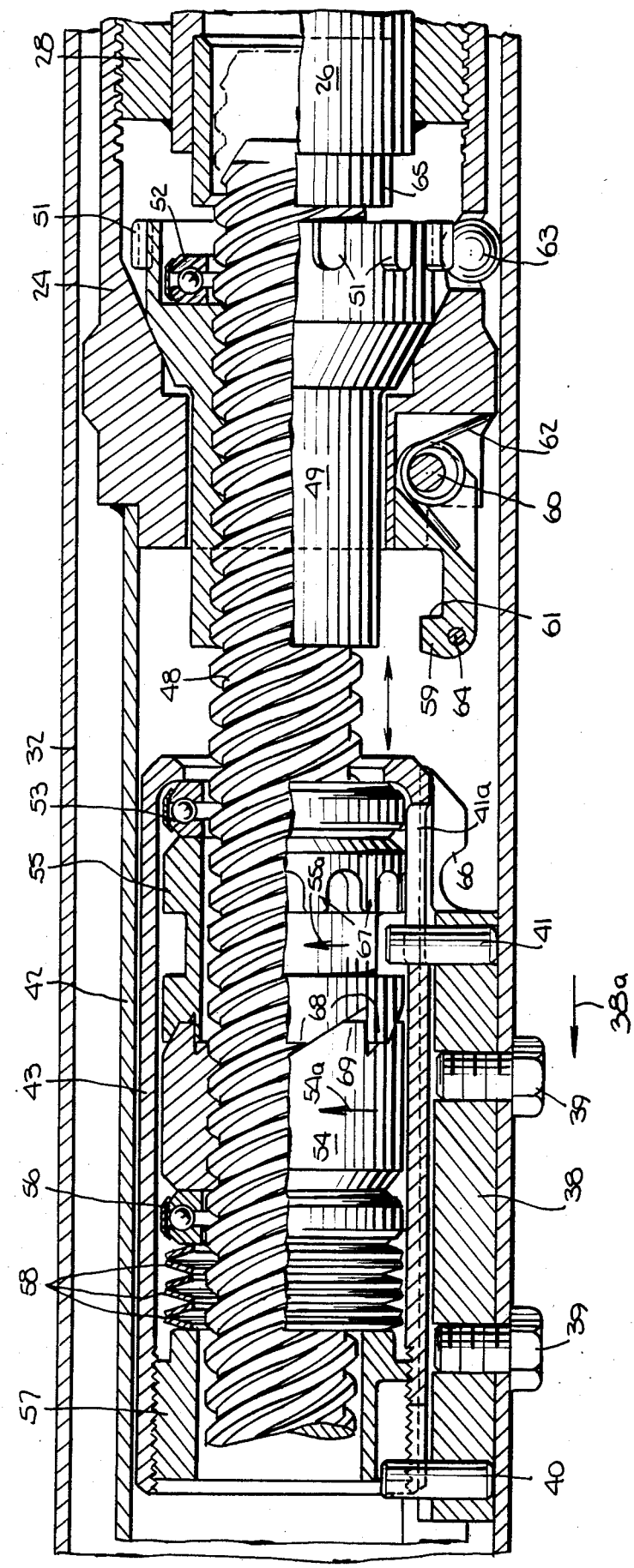
FIG. 13 is similar to FIG. 12, but illustrates the position of the parts with the slack adjuster measuring long piston travel to be shortened upon release of the brakes.

In FIG. 13, which illustrates the positions of the parts with the slack adjuster 1 measuring wear and/or overtravel to be shortened upon release of the brakes, the wear and/or over-travel is shown as having a large value. Normal wear, normally is not as large per brake application. The rotation of the control nut 54 and the control nut indexer 55 and the movement of the camming bar 38 are indicated, respectively, by the arrows 54a, 55a and 38a.

Figure 14:
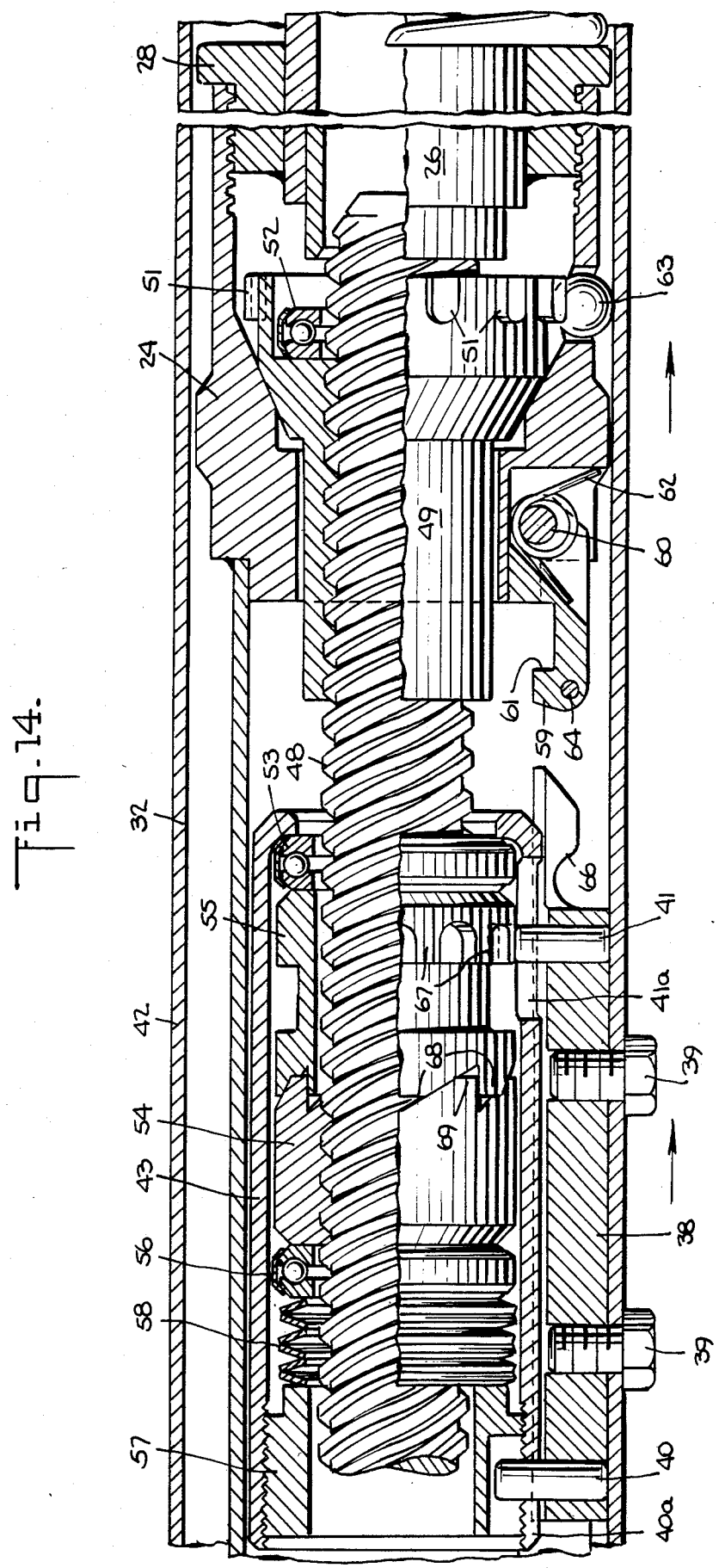
FIG. 14 is similar to FIG. 13, but illustrates the position of the parts after the brake cylinder starts to release its air and the brake rigging starts to relax.

In FIG. 14, which illustrates the positions of the parts after the start of air release from the cylinder and piston assembly 11, as the brake rigging starts to relax, the pin 41 is between teeth 67 of the control nut indexer 55, preventing rotation of the latter, and this is the first action which occurs upon release of air from the cylinder and piston assembly 11. The load nut 49 is still locked up and holds the load screw in the position illustrated.

Figure 15:
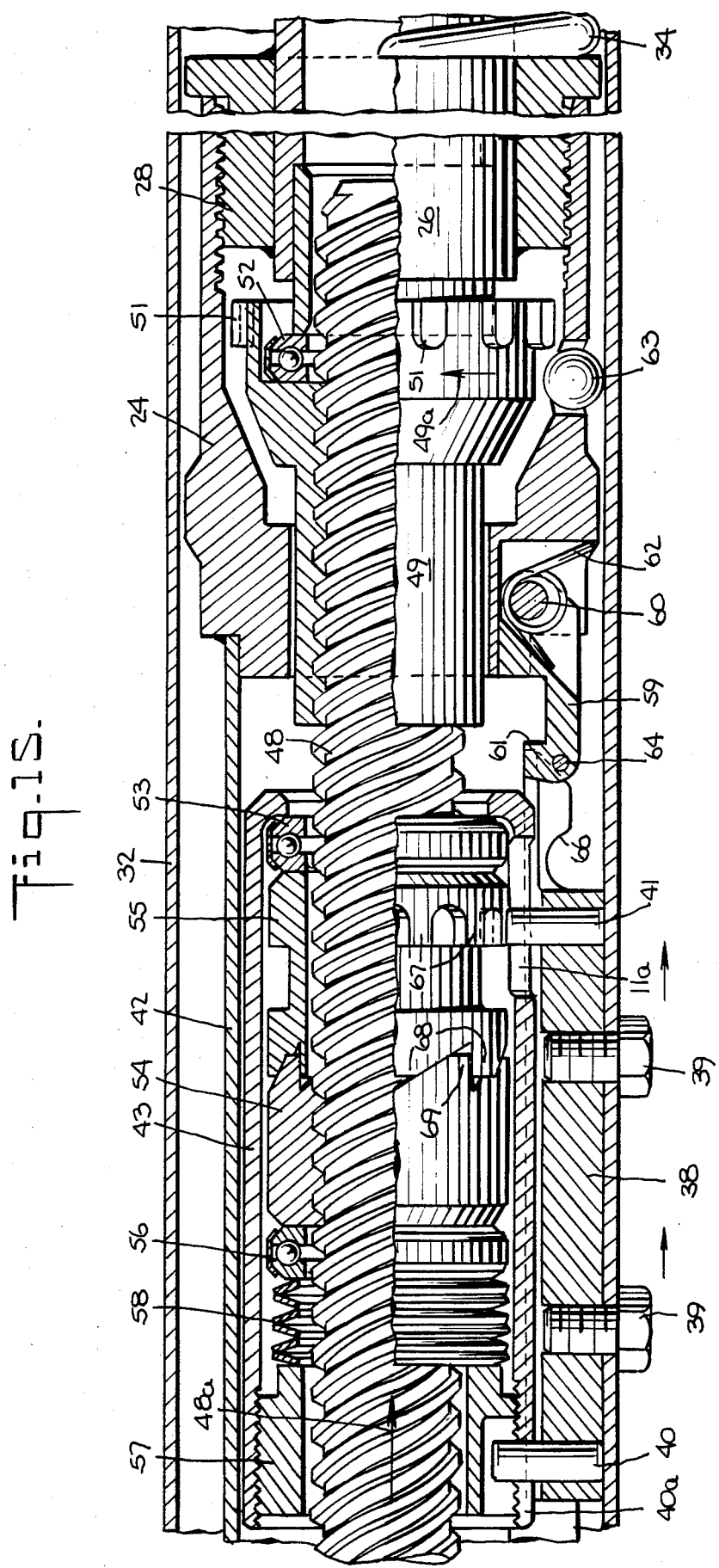
FIG. 15 is similar to FIG. 14, but illustrates the position of the parts as the brake cylinder piston continues to move back towards its zero piston travel position.

In FIG. 15, which illustrates the positions of the parts as the push rod 10 continues to move toward its zero piston travel position, the load nut 49 is rotating on the load screw 48 in the direction of the arrow 49a as the load screw 48 is moving into the actuator tube 32 in the direction of the arrow 48a to shorten the slack adjuster 1. The load nut 49 stops rotating when the slack is taken up and will remain in the unlocked condition when the brakes are fully released as shown in FIG. 3.

Let it be assumed that when the brakes are applied, it is necessary to increase the length of the slack adjuster 1, i.e., the distance between the points 2a and 3a. Since, initially, the collar 21 is not contacting the trigger 19 (FIG. 1), the actuator tube 32 can move with the tube 26 (because of the spring 34) as it moves to the right, as viewed in FIG. 3. At the same time that braking force is applied to the load tube 26 urging it toward the right, an opposite force is applied to the load screw 48 urging it to the left, but the tube 26 and the load screw 48 cannot move away from each other until the control nut 54 rotates. Rotation of the control nut 54 is opposed by the teeth 68 on the control nut indexer 55 which engage the teeth 69 on the control nut 54, and by the spring washers 58. When the braking force urging the load tube 26 and the load screw 48 apart exceeds a value of about 322 pounds, the control nut 54 will pull away from the control nut indexer 55 which is prevented from rotating by the pin 41. The resistance to letting out should exceed about 1050 pounds before the control nut 54 can rotate. Up to 1050 pounds is enough force to overcome rigging resistance in most cases. Also, the load nut 49 will rotate since the teeth 51 are out of contact with the ball 63 and its surface 50 is out of contact with the surface 50a. Accordingly, the distance between the points 2a and 3a may be increased only with a rigging force of about 1050 pounds or more and until the collar 21 engages the trigger 19 which will now allow axial movement of the actuator tube 32. Before this movement occurs however, the rigging resistance has been overcome, and the control nut 54, the control nut indexer 55 and the spring washers 58 have assumed the positions shown in FIG. 3. With the actuator tube 32 stopped, there is relative movement between the actuator tube 32 and the load housing assembly 24 as the brakes are further applied which causes the pawl 59 to be moved out of engagement with the control cage 43 (due to the cam surfaces 65 and 66 on the camming bar 38), thereby permitting the control cage 43 to move to the left, and causes ball 63 to enter between the teeth 51 of the cone lock load nut 49 and the surfaces 50 and 50a to engage preventing further rotation of the cone lock load nut 49. The relative positions of the parts at this time are shown in FIG. 12, and it will be observed that the braking force is transmitted from the load tube 26 thru the collar 28 to the load housing 24 and to the load screw 48 through the cone lock load nut 49.

Let it be assumed that the slack adjuster 1 is too long (piston travel over 8 inches) when the air brakes are next applied. In this case, the control rod collar 21 will contact the trigger 19 without too much brake cylinder effort, and the spring 34 will be compressed between the retainer 37 and the collar 28 (FIG. 3) as the brakes are applied. For the reasons set forth hereinbefore, this will cause the pawl 59 to become disengaged from the control cage 43 allowing the ball 63 to enter between the teeth 51 of the load nut 49, which causes and allows the load nut 49 to lock up. As the piston push rod 10 (FIG. 1) continues to extend, the pin 41 is moved out from between the teeth 67 of the control nut indexer 55 by the actuator tube 32 permitting the control nut 54 and the control nut indexer 55 to rotate without compressing the spring washers 58, FIG. 13 showing the positions of the parts at this stage. As the push rod 10 moves further, the control cage 43 is moved to the left by the pin 41 causing rotation of both the control nut 54 and the control nut indexer 55, as indicated in FIG. 13.

In the interval between the release of the pawl 59 from the control cage 43 and the entry of the ball 63 between the teeth 51 of the cone lock load nut 49, the spring 34 is compressed, but no force is applied between the load tube 26 and the load screw 48 tending to separate the tube 26 and the load screw 48 due to the fact that the load nut 49 is separated from the load housing 24. However, when the load tube 26, and hence, the load housing 24, moves far enough relative to the actuator tube 32, which is reached when the force of the spring 34 between the actuator tube 32 and the load housing 24 is about 334 pounds, the ball 63 enters between the teeth 51 on the load nut 49 and the surface 50 of the load nut 49 engages with the surface 50a on the load housing 24 thereby preventing rotation of the load nut 49 and causing the braking force to be applied to the load screw 48 through the load housing 24 and the load nut 49 as shown in FIG. 12.

Upon release of the brakes, the spring 34, FIG. 3, will return the actuator tube 32 and the load housing 24 to their relative positions which they have when the brakes are released (see FIG. 3). In moving to the released positions, the actuator tube 32 will move the camming bar 38 to the right (as viewed in the FIGS.) and the pin 41 will enter between the teeth 67 of the control nut indexer 55 preventing rotation of the control nut 54 as indicated in FIG. 12. Since the control nut 54 cannot rotate, the spring 34 will pull the load screw 48 and the control cage assembly 43 toward the load housing 24 thereby shortening the distance between points 2a and 3a. As the control cage 43 is moved toward its rest position, it pushes the load nut 49 to the right and to the rest position shown in FIG. 3, rotating after reaching this position to allow the load screw to move to the right to take up thus shortening the slack adjuster overall length.

When the brakes are next applied, the operations described will be repeated, that is, if the slack is excessive, the slack adjuster 1 will shorten and if the slack adjuster 1 is too short, it will lengthen. The slack adjuster of the invention will never allow short piston travels. However, unless the condition of the brake rigging changes between applications of the brakes, the length of the slack adjuster 1, between the points 2a and 3a, will be satisfactory for the next succeeding application of the brakes when the brakes have been applied only once.

It will also be noted that the slack adjuster 1 does not lock up until the control rod collar 21 moves the trigger 19 and will not let out until a force of over 1,000 pounds has been obtained in the slack adjuster. The force value at which it lets out is dependent upon the forces applied by the spring washers 58.

A modified, and somewhat simpler, form of the slack adjuster is illustrated in FIG. 16. The slack adjuster 71 illustrated in FIG. 16 differs from the slack adjuster 1 illustrated in the preceding FIGS. 1-15 substantially only in the replacement of some of the parts within the control cage 43 by a friction nut 72, by extensions of the screws 73 and 74 which hold the bar 38a on the actuator tube 32 and by a modified control cage 43a.

The control cage 43a has slots 75 and 76 therein which receive the extensions of the screws 73 and 74, and such slots 75 and 76 function with the ends of the screws 73 and 74 in the same manner as the slots 40a and 41a in the control cage 43 function with the pins 40 and 41. A snap ring 77 is mounted between the bearing 53 and one end of the control cage 43a, and the opposite end of the control cage 43a is closed by a collar 57a welded to the control cage 43a, as at 78.

The friction nut 72 is made of a material which, with suitably selected dimensions, will provide sufficient friction between the nut 72 and the threaded portion of the load screw 48 such that the nut 72 will not rotate, when the length of the slack adjuster 71 is too short, until the force tending to move the ends 2 and 3 apart is at least about 1,000 pounds. Assuming that the threads of the load screw 48 are as described hereinbefore, the friction nut 72 may, for example, be made of polyethylene or nylon, have an axial length of two and five eighth inches and have a free running fit between its threads and the threads of the load screw 48. However, it will be apparent that other materials, dimensions and fits, which may be readily selected by those skilled in the art, may be used to provide the friction desired for the force required to cause rotation of the friction nut 72 with braking forces.

It will be apparent to those skilled in the art that the slack adjuster 71 illustrated in FIG. 16 will operate in a manner similar to the manner in which the embodiment illustrated in FIGS. 1-15 operates. Thus, the friction nut 72 performs the functions of the control nut 54, the control nut indexer 55 and the spring washers 58, and the remaining parts function in the same manner as the corresponding parts of the embodiment illustrated in FIGS. 1-15.

The helical spring 34 causes the friction nut 72 to exert a 322 pound force on the cage collar 57a. This is enough force to keep the friction nut 72 from rotating when the train is impacted so that the slack adjuster 71 will not let-out or take-up falsely.

As the brake force increases above the 322 pound force the frictional force applied to prevent rotation of the friction nut 72 also increases. However, the rate of increase is less than the rate of increase of the brake cylinder force, and there is a greater frictional force created between the threads of the friction nut 72 and the load screw threads. The principle is the same as simply trying to pull a bolt thru a nut. The threads of the load screw 48 and the threads of friction nut 72 tend to oppose rotation of the friction nut 72. It has been found through tests of the embodiment described that the combination of these two frictional forces require at least a 1,000 pound force on the slack adjuster 71 to extend the adjuster 71. Accordingly, a force of about 1,000 pounds tending to move the ends 2 and 3 apart is required before the friction nut 72 will rotate and permit the slack adjuster 71 to lengthen until the load nut 49 locks up, and when the slack adjuster 71 is to shorten, the friction nut 72 will rotate in the same manner as the control nut 54. Upon release of the brakes after the latter action, the friction nut 72 will apply a shortening force of at least 500 pounds to the load screw 48 for moving the load screw 48 toward the tube 26.

Although perferred embodiments of the present invention have been described and illustrated, it will be apparent to those skilled in the art that various modifications may be made without departing from the principles of the invention.

What is claimed is:

1. A slack adjusting device comprising:
   a first load member;
   a second load member coaxial with said first load member and movable axially relative to said first load member;
   first braking means acting between said first load member and said second load member, said second load member being movable axially of said first braking means from a first position in which said first load member is permitted by said first braking means to move axially relative to said second load member to a second position in which said first load member is prevented by said first braking means from moving axially relative to said second load member;
   releasable second braking means acting between said first load member and said second load member, said second braking means being movable axially with respect to said second load member and including first spring means applying a restraining force to said second braking means and preventing movement of said first and second load members in opposite axial directions until a force which will overcome said restraining force and which urges said first load member and said second load member in axially opposite directions is applied to said first load member and said second load member;
   non-rotatable releasable means, in addition to said second braking means, acting between said second load member and said second braking means for preventing said second braking means from moving axially relative to said second load member; and
   an actuator member which is non-rotatable relative to said second load member and which is movable axially relative to said second load member and said second braking means, said actuator member having means for releasing said releasable means, and thereby, permitting said second braking means to move axially relative to said second load member, when said actuator member has a predetermined axial position relative to said second load member and said actuator member also having means for releasing said second braking means, and thereby, permitting said first load member to move axially relative to said second load member, when said actuator member has a predetermined axial position relative to said second braking means; and
   second spring means acting between said actuator member and said second load member and urging said actuator member and said second load member in opposite axial directions;
   whereby when said actuator member is not actuated, said first load member is prevented from moving in an axial direction away from said second load member until a force urging the first load member away from said second load member overcomes said restraining force and when said actuator member is thereafter actuated, said second load member is permitted to move axially relative to said second braking means until it reaches said second position thereof in which said first braking means prevents further relative axial movement between said first load member and said second load member and whereby when said force is applied, said actuator is actuated and said second braking means reaches its second position before said force reaches said predetermined value, said second braking means is released permitting said second braking means to move axially away from said second load member and when said force is thereafter reduced, said second braking means again becomes effective and causes said first load member to move toward said second load member.

2. A slack adjusting device comprising:

first and second elongated, load members mounted with their lengths substantially parallel and for movement in their length directions, such directions being axial directions and said first and second load members having load connecting means at the ends thereof remote from each other;

first braking means acting between said first and second load members, said first braking means permitting said first and second load members to move in axially opposite directions when said second load member is in a first axial position relative to said first braking means and preventing such movement when said second load member is in a second axial position relative to said first braking means;

second braking means with braking surfaces and which is axially movable, which acts between said first and second load members and which is releasably connected to said second load member, said second braking means including first spring means applying a restraining force to said second braking means and preventing movement of said first and second load members in opposite axial directions until a force which will overcome said restraining force is applied to said first and second load means urging them in opposite axial directions to permit said first and second members to move in opposite axial directions but having release means other than said braking surfaces which causes said second braking means to permit said first and second load members to move toward each other;

non-rotatable releasable means, in addition to said second braking means, interconnecting said second load member and said second braking means for preventing relative axial movement between said second load member and said second braking means;

an actuator member which is non-rotatable relative to said second load member and which is mounted for axial movement and having release means for actuating said release means of said second braking means and for actuating said releasable means dependent upon the axial position of said actuator member, said actuator member operating said release means of said second braking means when the distance between said load member ends is to be reduced and operating said releasable means when the distance between said load member ends is to be increased; and second spring means acting between said actuator member and said second load member and urging said actuator member and said second load member in axially opposite directions whereby for an increase of the distance between said load member ends, said force overcomes said restraining force, said actuator is actuated and said releasable means is operated and to decrease the distance between said load member ends, said actuator is actuated and said release means of said second braking means is operated.

3. A slack adjusting device as set forth in claim 2 wherein the first load member is a load screw, the second load member is coaxial with said load screw and said actuator member comprises a tubular portion surrounding a portion of said load screw and a portion of the second load member, said actuator member being slidably mounted on said second load member, and wherein said first braking means comprises a load nut rotatably mounted on said load screw and having internal threads mating with the threads on said load screw and wherein said second load member has surface engaging means engagable with a surface of said load nut in said second axial position of said second load member for preventing rotation of said load nut.

4. A slack adjusting device as set forth in claim 3 wherein said load nut has a plurality of peripheral teeth and said surface engaging means comprises means projecting from said second load member and insertable between a pair of said teeth.

5. A slack adjusting device as set forth in claims 3 or 4 wherein said load nut has a frusto-conical peripheral surface and said surface engaging means comprises a mating frusto-conical surface on said second load member.

6. A slack adjusting device as set forth in claim 2 wherein the first load member is a load screw and the second load member is coaxial with said load screw and wherein said second braking means comprises a control nut rotatably mounted on said load screw and having internal threads mating with the threads of said load screw.

7. A slack adjusting device as set forth in claim 6 wherein said second braking means further comprises a control nut indexer having a surface engageable with a surface of said control nut for braking rotation of said control nut and spring means acting between said second load member and said control nut and urging said surface of the latter toward said surface of said control nut indexer.

8. A slack adjusting device as set forth in claim 7 wherein said control nut surface and said control nut indexer surface have interengaging ratchet teeth and said control nut indexer also has teeth around the periphery thereof forming said release means of said second braking means and wherein said release means of said actuator member comprises projecting means on said actuator member and insertable between and removable from a pair of said teeth on the periphery of said control nut indexer.

9. A slack adjusting device as set forth in claim 6 or 8 wherein said second braking means comprises a control cage around said control nut and axially movable therewith.

10. A slack adjusting device as set forth in claim 9 wherein said releasable means interconnecting said second load member and said second braking means comprises a pawl pivotally mounted on one of the second load member and said control cage and engageable with a surface on the other of the second load member and said control cage.

11. A slack adjusting device as set forth in claim 10 wherein said release means of said actuator member comprises a cam member mounted on said actuator member and engageable with said pawl.

12. A slack adjusting device as set forth in claim 9 wherein said actuator member comprises means thereon engageable with said control cage for moving said control cage axially with axial movement of said actuator member and thereby permitting said second braking means to move axially of said first load member.

13. A slack adjusting device as set forth in claim 2 wherein the first load member is a load screw, the second load member is coaxial with said load screw and said actuator member comprises a tubular portion surrounding a portion of said load screw and a portion of the second load member, said actuator member being slidably mounted on said second load member, and wherein said first braking means comprises a load nut rotatably mounted on said load screw and having internal threads mating with the threads on said load screw and wherein said second load member has surface engaging means engageable with a surface of said load nut in said second axial position of said second load member for preventing rotation of said load nut, whereby movement of said load screw axially away from said second load member causes said surface engaging means of said second load member to engage said surface of said load nut and prevents rotation of the latter, thereby preventing further axial movement of said load screw away from said second load member, wherein said second braking means comprises a control nut rotatably mounted on said load screw and having internal threads mating with the threads of said load screw, a control nut indexer having a surface engageable with a surface of said control nut for braking rotation of said control nut and spring means acting between said second load member and said control nut and urging said surface of the latter toward said surface of said control nut indexer with a force sufficient to require a force of at least 300 pounds acting to move said load screw and said second load member in axially opposite directions to cause rotation of said control nut and a control cage around said control nut and axially movable therewith, wherein said releasable means interconnecting said second load member and said second braking means comprises a pawl pivotally mounted on one of the second load member and said control cage and engageable with a surface on the other of the second load member and said control cage, wherein said release means of said actuator member comprises a cam member mounted on said actuator member and engageable with said pawl for releasing said pawl and permitting said second load member to move axially relative to said control cage when said actuator reaches a predetermined axial position relative to said pawl, and wherein said actuator member comprises means thereon engageable with said control cage for moving said control cage axially with axial movement of said actuator member for causing rotation of said control nut and movement of said load screw axially toward said second load member when the force urging said load screw and said second load member in opposite axial directions is reduced and said actuator member is actuated.

* * * * *